US006657773B2

United States Patent
Chiaroni et al.

(10) Patent No.: US 6,657,773 B2
(45) Date of Patent: Dec. 2, 2003

(54) WAVELENGTH SELECTOR AND CONVERTER AND A PHOTONIC SWITCHING MATRIX INCORPORATING IT

(75) Inventors: Dominique Chiaroni, Antony (FR); Nicolas Le Sauze, Chaville (FR); Alain Pons, Ollainville (FR); Roland Mestric, Paris (FR)

(73) Assignee: Alcatel, Paris (FR)

( * ) Notice: Subject to any disclaimer, the term of this patent is extended or adjusted under 35 U.S.C. 154(b) by 257 days.

(21) Appl. No.: 09/951,719

(22) Filed: Sep. 14, 2001

(65) Prior Publication Data

US 2002/0033994 A1 Mar. 21, 2002

(30) Foreign Application Priority Data

Sep. 18, 2000 (FR) .............................................. 00 11888

(51) Int. Cl.[7] ................................ G02F 2/02; G02B 6/35
(52) U.S. Cl. ......................... 359/326; 385/16; 398/82
(58) Field of Search ................................. 359/326–332; 398/82; 385/16, 17, 24

(56) References Cited

U.S. PATENT DOCUMENTS

| 5,612,805 | A | 3/1997 | Fevrier et al. ................. 398/83 |
| 5,896,212 | A | 4/1999 | Sotom et al. .................. 398/55 |
| 5,953,142 | A | 9/1999 | Chiaroni et al. ............... 398/82 |
| 2003/0002099 | A1 * | 1/2003 | Sayyah et al. ............... 359/124 |

FOREIGN PATENT DOCUMENTS

EP 0 310 058 A2 4/1989

* cited by examiner

*Primary Examiner*—John D. Lee
(74) *Attorney, Agent, or Firm*—Sughrue Mion, PLLC

(57) ABSTRACT

To increase the bit rate of wavelength division multiplexed optical data switched in a photonic switching matrix, whilst maintaining a high bandwidth, a wavelength selector and converter includes a demultiplexer with n outputs respectively connected to n inputs of a coupler via n wavelength converters. Each wavelength converter has an optical gate function and selectively supplies converted signals conveyed by the same wavelength. Applications include optical packet switching.

14 Claims, 3 Drawing Sheets

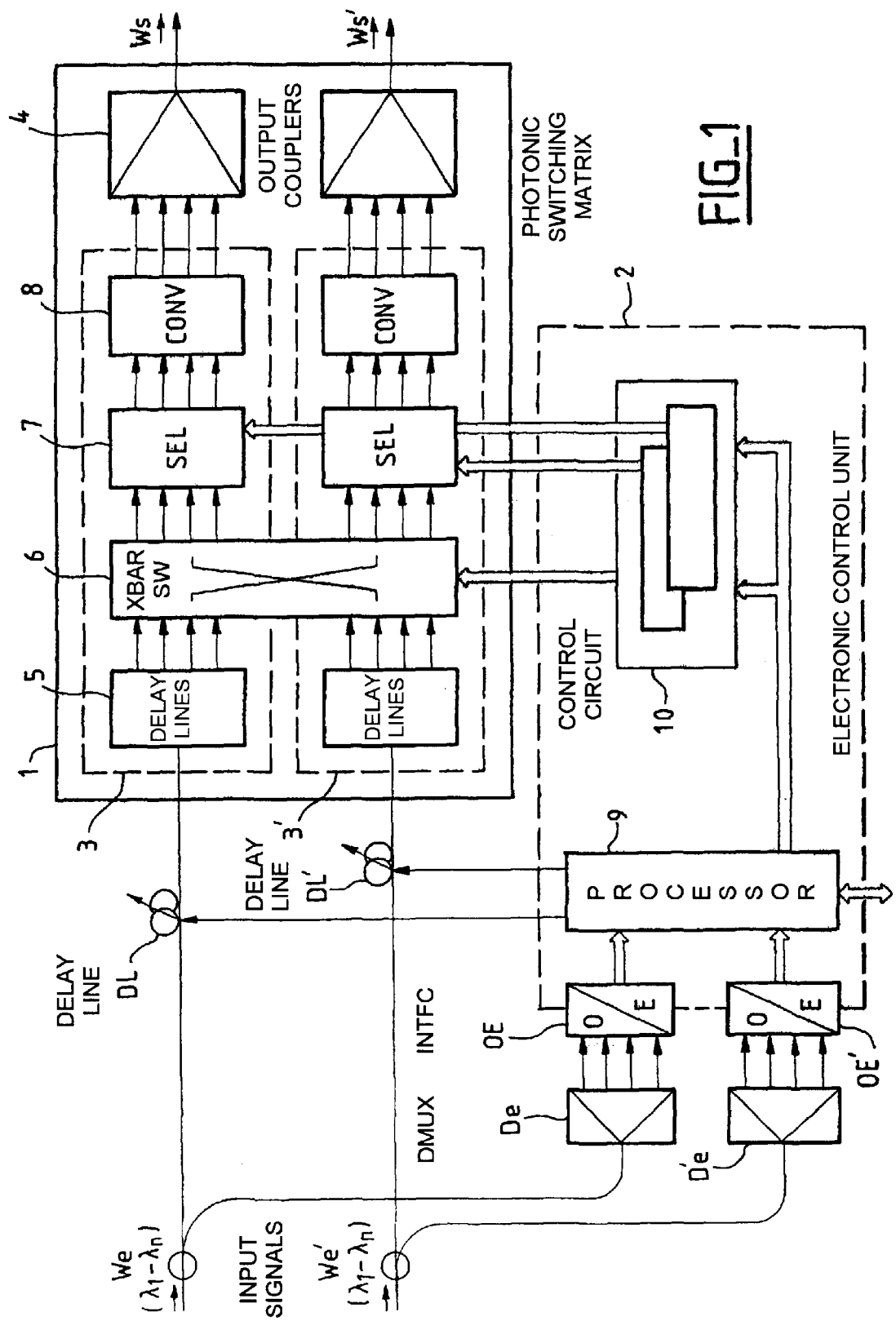
FIG_1

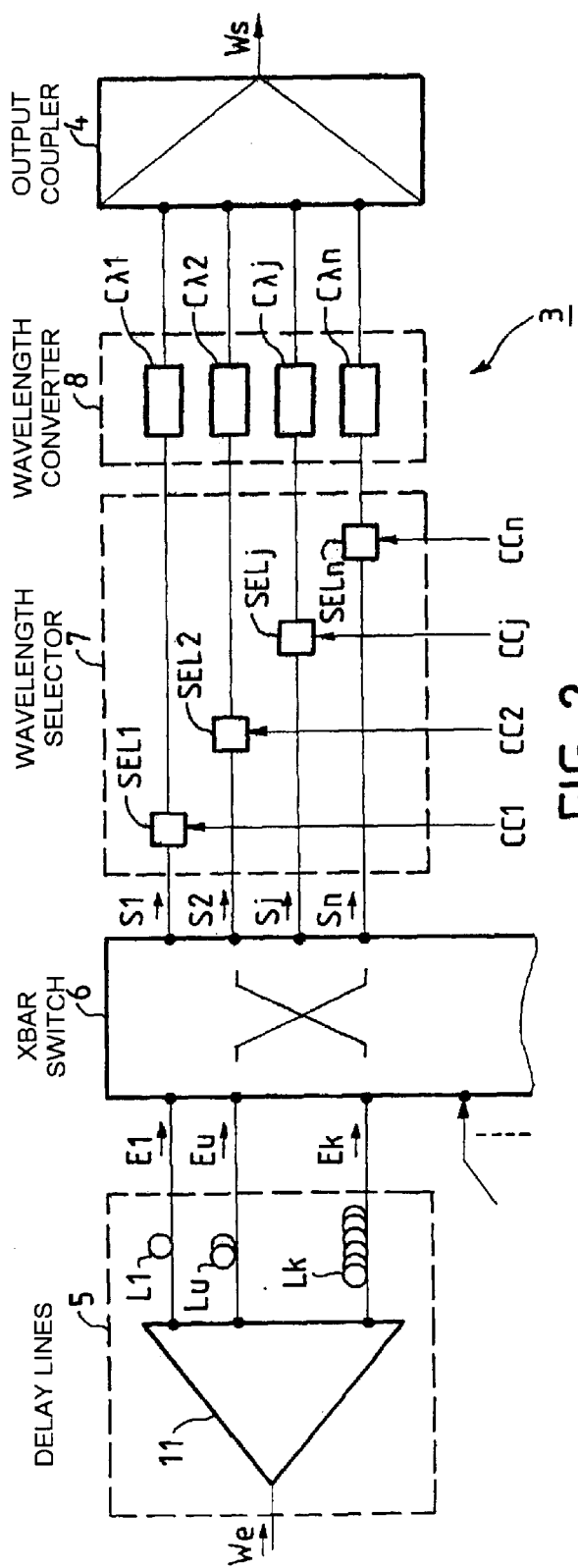
FIG_2
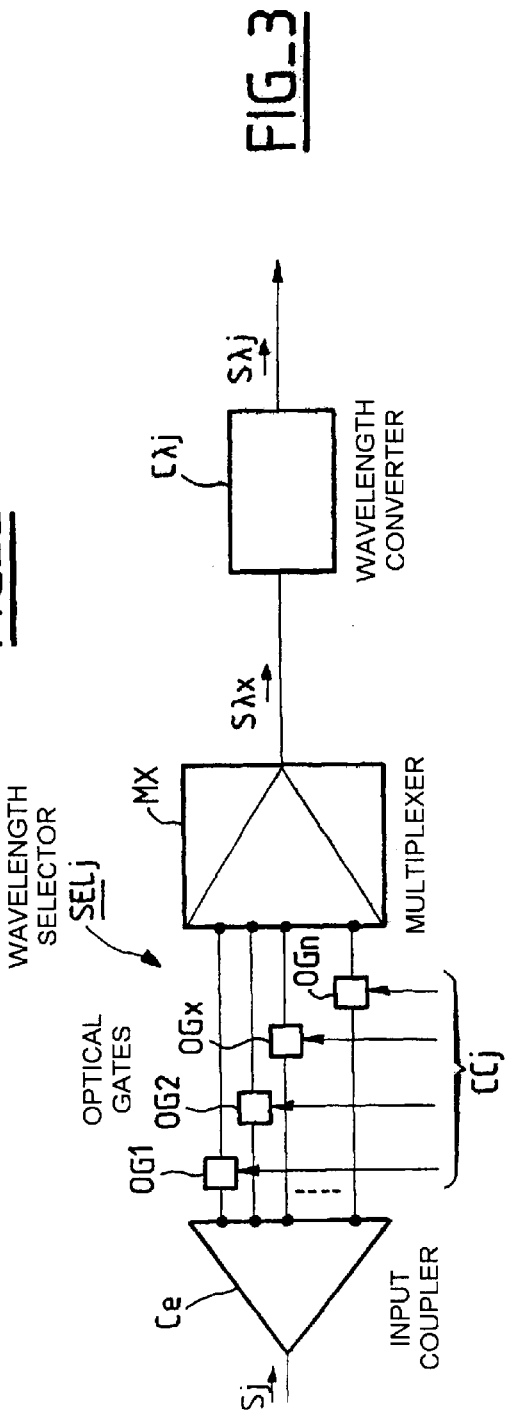
FIG_3

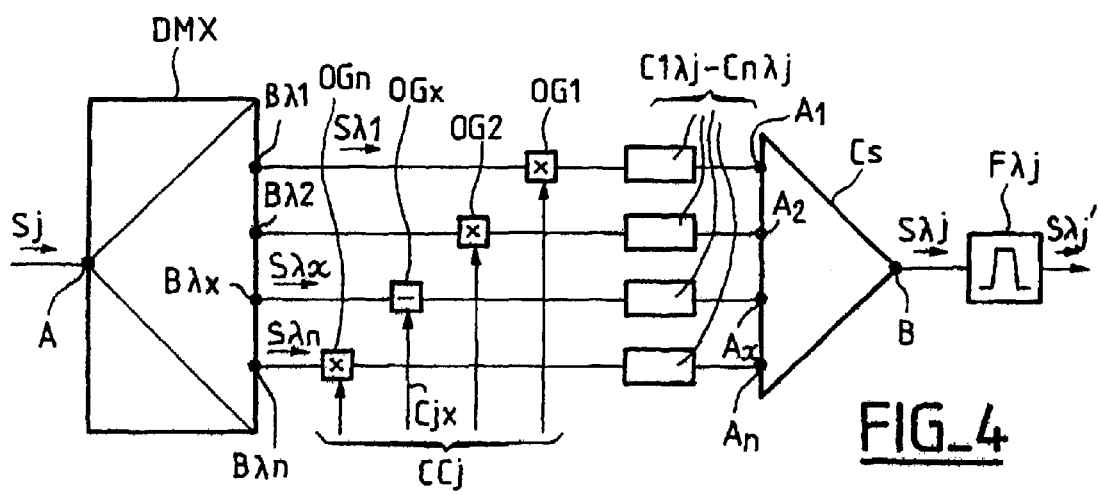
FIG_4
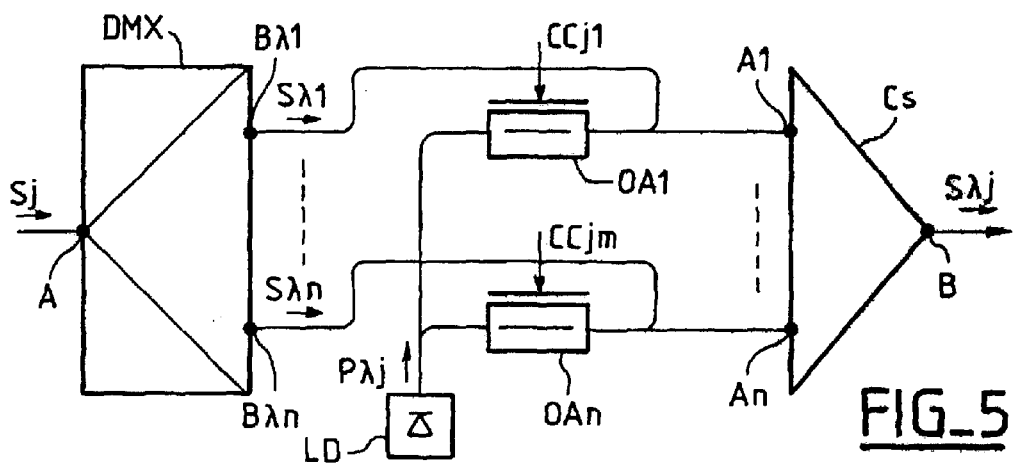
FIG_5
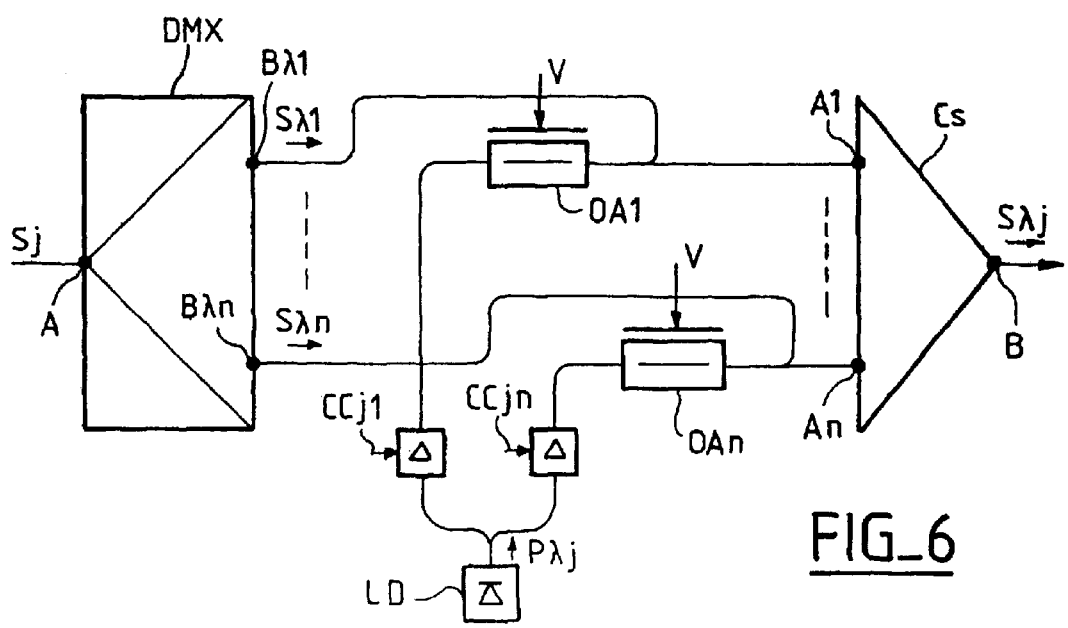
FIG_6

WAVELENGTH SELECTOR AND CONVERTER AND A PHOTONIC SWITCHING MATRIX INCORPORATING IT

CROSS-REFERENCE TO RELATED APPLICATIONS

This application is based on French Patent Application No. 00 11 888 filed Sep. 18, 2000, the disclosure of which is hereby incorporated by reference thereto in its entirety, and the priority of which is hereby claimed under 35 U.S.C. §119.

BACKGROUND OF THE INVENTION

1. Field of the Invention

The invention relates to optical transmission networks and more precisely to switches for wavelength division multiplexed optical signals organized into packets.

2. Description of the Prior Art

Generally speaking, optical packet switching networks include nodes provided with fast packet switches for routing fixed or variable size groups of data, usually referred to as "packets" in the case of the Internet or "cells" in the case of an ATM network.

Photonic switching matrices are "all optical" switches in which data, generally in the form of amplitude modulation of an optical carrier wave, is routed from one optical link to another without changing its optical nature, i.e. without conversion into the electrical domain. One function of photonic switching matrices is to synchronize the packets with a view to managing conflicts in order to minimize the loss of packets. If wavelength division multiplexing (WDM) is used, the matrices must also be designed to take account of the wavelength of the signals to be switched.

The invention relates to a wavelength selector and converter that can be used in matrices for controlling wavelength division multiplexing.

The invention also relates to a photonic switching matrix incorporating the wavelength selector and converter.

FIG. 1 shows an example of an optical switch to which the invention may be applied.

The switch essentially consists of a photonic switching matrix 1 and an associated electronic control unit 2.

The matrix 1, which receives a plurality of input WDM optical signals We, We', is made up of a plurality of modules 3, 3'. For simplicity, only two modules and two WDM signals are shown.

The signals We, We', each consisting of a plurality of channels λ1–λn, are respectively connected on the one hand to the modules 3, 3' via variable delay lines DL, DL' and on the other hand to optical-electrical converter interfaces OE, OE' of the control unit 2 via demultiplexers De, De'.

The switching matrix 1 includes, connected in cascade, sets of delay lines 5 each belonging to one of the modules 3, 3', a common "crossbar" space switch 6, wavelength selector stages 7, wavelength reallocator stages 8, and output coupler stages 4 each belonging to one of the modules.

The electronic control unit 2 includes a processor 9 connected on the one hand to the outputs of the optical-electrical converter interfaces OE, OE' and on the other hand to a control circuit 10.

A first function of the processor 9 is to decode the headers of the packets received to extract their respective destinations. Depending on the destination information, conditioned by choices imposed by a routing table, the unit 9 then detects any possible conflicts. Accordingly, for each packet received conveyed by each wavelength, the unit 9 determines to which output port of the matrix the packet must be directed and at what time. This routing information is transmitted to the control circuit 10 which then sends appropriate control signals to the space switch 6 and to the wavelength selector stages 7.

FIG. 2 shows one of the modules 3 of the matrix 1 in more detail. The set 5 of delay lines essentially consists of k delay lines L2, Lu, Lk of different lengths and each adapted to create a time-delay that is an integer multiple of the time to transmit a packet. Each delay line receives the input multiplex We associated with the module via a broadcast coupler 11.

The outputs of the k delay lines are respectively connected to k inputs of the common space switch 6.

The wavelength selector stage 7 consists of n wavelength selectors SEL1, SEL2, SELj, SELn respectively controlled by control signals CC1, CC2, CCj, CCn from the control circuit 10.

The inputs of the n selectors are respectively connected to n outputs of the space switch 6 supplying the signals S1, S2, Sj, Sn. The outputs of the selectors SEL1, SEL2, SELj, SELn are respectively connected to n inputs of a multiplexer 4 via wavelength converters Cλ1, Cλ2, Cλj, Cλn constituting the wavelength reallocator stage 8.

Accordingly, depending on the state of the space switch 6 and the wavelengths selected by the various selectors, each packet belonging to any input multiplex and conveyed by any wavelength can be subjected to a chosen time-delay, routed to any output of the matrix, and conveyed at that output by a new wavelength.

The wavelength of the signals can be taken into account by virtue of the wavelength selector stage 7 and the wavelength reallocator stage 8. Accordingly, each signal Sj from an output of the switch 6 is processed by a wavelength selector and converter SELj, Cλj of one of the modules 3 before it is injected into the multiplexer 4 of that module.

The selector function implemented by each selector SELj consists of extracting from the WDM signal Sj received from the switch 6 a signal that is conveyed by only one of the wavelengths assigned to the channels of the WDM signal. The function of the wavelength converters Cλ1–λn of the same module 3 is to have the signals extracted in this way conveyed by new wavelengths λ1–λn that are fixed and different from each other so that they can be recombined by the multiplexer 4 to constitute an output WDM signal Ws.

FIG. 3 shows a prior art wavelength selector and converter SELj, Cλj associated with one output of the switch 6.

The selector and converter SELj includes an input broadcast coupler Ce with one input and n outputs respectively connected to n inputs of a multiplexer MX via n optical gates OG1, OG2, OGx, OGn electrically controlled by the signals CCj. The output of the multiplex MX is connected to the input of the wavelength converter Cλj.

In operation, the input coupler Ce receives the WDM signal Sj and the optical gates receive the control signals CCj such that only one of the gates is open, for example the gate OGx. Accordingly, only the input of the multiplexer MX that is connected to the gate OGx receives the signal Sj and, given the filter function of the multiplexers, only the wavelength that matches that input is transmitted to the output of the multiplexer MX, for example the wavelength λx. The multiplexer then supplies to the converter Cλj a signal Sλx that is part of the channel carried by the wavelength λx. Depending on the signal Sλx selectively extracted in this way, the converter Cλj delivers the converted signal Sλj conveyed by the wavelength λj imposed by that converter.

Accordingly, the converter Cλj must be able to convert any wavelength of the received WDM signal.

Conventional wavelength converters are based on semiconductor optical amplifiers operating under crossed gain modulation conditions or interferometer structures, for example Mach-Zehnder structures, using crossed phase modulation. They have a particular bandwidth, i.e. can convert correctly optical signals whose carrier has a wavelength included in that bandwidth.

In practice the bandwidth of the converters is related to the frequency of the signal modulating the carriers and therefore to the bit rate of the data to be transmitted. To be more precise, for a given type of converter, to increase the bit rate it is necessary to increase the speed of its optical components, and therefore that of the converter, although this reduces the bandwidth. For example, for a bit rate of 10 Gbit/s, a converter can be used that is based on a semiconductor optical amplifier with a low confinement factor and providing a bandwidth in excess of 40 nm. To achieve a bit rate of 40 Gbit/s, it is necessary to increase the confinement factor of the amplifier used and/or the length of its active area, but the bandwidth is reduced, and may be insufficient for wideband WDM applications.

One solution to this problem could be to design more sophisticated converters, for example converters using a cascade of semiconductor optical amplifiers. This solution would indeed increase the bit rate and maintain the bandwidth, but to a limited degree and at additional cost.

An object of the invention is to remedy this drawback.

SUMMARY OF THE INVENTION

To this end, the invention provides a wavelength selector and converter adapted to extract selectively from a wavelength division multiplex signal a signal conveyed by a wavelength assigned to a channel of the multiplex signal and to have the selectively extracted signal conveyed by a particular wavelength, which wavelength selector and converter includes:

a demultiplexer adapted to separate n channels of the multiplexed signal and to supply at n outputs n corresponding extracted signals, and a coupler having n inputs respectively connected to the outputs of the demultiplexer via n corresponding wavelength converters, in which wavelength selector and converter each converter has an optical gate function and can selectively supply a converted signal conveyed by the particular wavelength as a function of the extracted signal that it receives.

Because of the presence of a plurality of converters each processing a signal conveyed by a clearly defined wavelength, it is possible to use fast converters which can nevertheless be of simple design because it is sufficient to adapt them to operate in a narrow band centered on the respective wavelengths assigned to them. Also, the optical powers at the output of the converters can be adjusted separately, which enables more flexible adjustment.

In one embodiment of the invention, each wavelength converter includes a semiconductor optical amplifier used as an optical gate and receiving one of the extracted signals and a probe wave having the particular wavelength, the converted signal being the probe wave amplified by the amplifier with a gain that is a function of the optical power of the extracted signal that it receives.

The advantage of this embodiment is that only one component, the semiconductor optical amplifier, has the function of both an optical gate and of a wavelength converter. As a result the complexity and therefore the cost of fabrication remain at a similar level to those of the conventional solution.

Each amplifier is advantageously adapted to have a maximum gain at the wavelength of the extracted signal that it receives.

The invention also provides a photonic switching matrix including a wavelength selector and converter in accordance with the invention.

Other aspects and advantages of the invention will become apparent in the remainder of the description, which is given with reference to the drawings.

BRIEF DESCRIPTION OF THE DRAWINGS

FIG. 1 shows one example of an optical switch, already commented on above.

FIG. 2 shows one module of a photonic switching matrix, also commented on above.

FIG. 3 shows a prior art wavelength selector and converter, also commented on above.

FIG. 4 is a theoretical diagram of a wavelength selector and converter in accordance with the invention.

FIG. 5 shows a first preferred embodiment of a wavelength selector and converter in accordance with the invention.

FIG. 6 shows a second preferred embodiment of a wavelength selector and converter in accordance with the invention.

DETAILED DESCRIPTION OF THE PREFERRED EMBODIMENTS

The wavelength selector and converter shown in the FIG. 4 theoretical diagram includes a demultiplexer DMX which has an input A and n outputs Bλ1–Bλn respectively connected to n corresponding inputs A1–An of a coupler Cs via n optical gates OG1–OGn followed by corresponding wavelength converters C1λj–Cnλj. Each converter supplies a converted signal conveyed by the same wavelength λj.

In operation, the input A receives the WDM signal Sj and the outputs Bλ1–Bλn respectively supply n signals Sλ1–Sλn extracted from the received signal Sj and corresponding to n channels λ1–λn of the WDM signal. The optical gates OG1–OGn also receive control signals CCj such that only one of the gates is open. For example, by applying the control signal CCj to only the gate OGx, only the converter associated with that gate supplies a converted signal as a function of the corresponding extracted signal Sλx.

An optical filter Fλj tuned to the wavelength λj can be connected to the output B of the coupler Cs to eliminate noise generated by the optical gates and/or the converters.

FIGS. 5 and 6 show two embodiments of the invention based on semiconductor optical amplifiers OA1–OAn used both as optical gates and as wavelength converters.

The semiconductor optical amplifiers operate under crossed gain modulation conditions and each receives one of the signals Sλ1–Sλn extracted by the demultiplexer DMX and a probe wave Pλj of wavelength λj supplied by a common laser source LD. This is known in the art.

The probe wave Pλj and the extracted signal Sλ1–Sλn injected into each amplifier have opposite propagation directions in this example. Although it is not indispensable, this limits filtering constraints at the output of the coupler Cs.

In the FIG. 5 variant the optical gate function of the amplifiers is obtained by operating on their supply voltages. Note that the probe wave could be mixed with the input signal Sj if the demultiplexer DMX were able to extract it via an output provided for this purpose.

In the FIG. 6 variant, the optical gate function of the amplifiers is obtained by selectively injecting the probe wave P$\lambda$j into only one of the amplifiers. To this end, the laser source LD is connected to the amplifiers via controlled optical gates. This variant has the advantage of facilitating integration of the optical parts of a plurality of devices to provide a complete integrated matrix.

To optimize the implementation, each amplifier has a maximum gain at the wavelength of the extracted signal that it receives. This can be achieved by appropriately choosing the composition of the active layer of each amplifier and its geometry, in a manner that is well known to manufacturers of optical components.

As already described with reference to FIGS. 1 and 2, the photonic switching matrix 1 in accordance with the invention includes one or more sets 5 of delay lines, a space switch 6, one or more wavelength selector stages 7 and one or more wavelength reallocator stages 8. In accordance with the invention, the wavelength selector stages 7 and the wavelength reallocator stages 8 include wavelength selectors and converters as described with reference to FIGS. 4 to 6.

There is claimed:

1. A wavelength selector and converter adapted to extract selectively from a wavelength division multiplex signal a signal conveyed by a wavelength assigned to a channel of said multiplex signal and to have said selectively extracted signal conveyed by a particular wavelength, which wavelength selector and converter includes:

a demultiplexer adapted to separate n channels of said multiplexed signal and to supply at n outputs n corresponding extracted signals, and a coupler having n inputs respectively connected to said outputs of said demultiplexer via n corresponding wavelength converters, in which wavelength selector and converter each converter has an optical gate function and can selectively supply a converted signal conveyed by said particular wavelength as a function of the extracted signal that it receives.

2. The wavelength selector and converter claimed in claim 1 wherein each wavelength converter includes a semiconductor optical amplifier used as an optical gate and receiving one of said extracted signals and a probe wave having said particular wavelength, said converted signal being said probe wave amplified by said amplifier with a gain that is a function of the optical power of said extracted signal that it receives.

3. The wavelength selector and converter claimed in claim 2 wherein each amplifier has a maximum gain at the wavelength of the extracted signal that it receives.

4. The wavelength selector and converter claimed in claim 2 wherein said probe wave and said extracted signal injected into said amplifier have opposite propagation directions.

5. The wavelength selector and converter claimed in claim 2 wherein said optical gate function of said amplifiers is obtained by selectively applying power supply voltages to said amplifiers.

6. The wavelength selector and converter claimed in claim 2 wherein said optical gate function of said amplifiers is obtained by selectively injecting said probe waves into said amplifiers.

7. The wavelength selector and converter claimed in claim 1 including an optical filter connected to an output of said coupler and tuned to said particular wavelength.

8. A photonic switching matrix including, connected in cascade, at least one set of delay lines, a space switch, at least one wavelength selector stage and at least one wavelength reallocator stage, in which matrix said wavelength selector and wavelength reallocator stages include wavelength selectors and converters adapted to extract selectively from a wavelength division multiplex signal a signal conveyed by a wavelength assigned to a channel of said multiplex signal and to have said selectively extracted signal conveyed by a particular wavelength, which wavelength selector and converter includes:

a demultiplexer adapted to separate n channels of said multiplexed signal and to supply at n outputs n corresponding extracted signals, and a coupler having n inputs respectively connected to said outputs of said demultiplexer via n corresponding wavelength converters, in which wavelength selector and converter each converter has an optical gate function and can supply selectively a converted signal conveyed by said particular wavelength as a function of the extracted signal that it receives.

9. The matrix claimed in claim 8 wherein each wavelength converter includes a semiconductor optical amplifier used as an optical gate and receiving one of said extracted signals and a probe wave having said particular wavelength, said converted signal being said probe wave amplified by said amplifier with a gain that is a function of the optical power of said extracted signal that it receives.

10. The matrix claimed in claim 9 wherein each amplifier has a maximum gain at the wavelength of the extracted signal that it receives.

11. The matrix claimed in claim 9 wherein said probe wave and said extracted signal injected into said amplifier have opposite propagation directions.

12. The matrix claimed in claim 9 wherein said optical gate function of said amplifiers is obtained by selectively applying power supply voltages to said amplifiers.

13. The matrix claimed in claim 9 wherein said optical gate function of said amplifiers is obtained by selectively injecting said probe waves into said amplifiers.

14. The matrix claimed in claim 8 including an optical filter connected to an output of said coupler and tuned to said particular wavelength.

* * * * *